(12) United States Patent
Higgins et al.

(10) Patent No.: US 12,152,343 B1
(45) Date of Patent: Nov. 26, 2024

(54) TRICHROMATIC FIBER DYEING PROCESSES AND COMPOSITIONS THEREOF

(71) Applicant: Columbia Insurance Company, Omaha, NE (US)

(72) Inventors: Pam Higgins, Dalton, GA (US); Bryan Morton, Dalton, GA (US)

(73) Assignee: Columbia Insurance Company, Omaha, NE (US)

( * ) Notice: Subject to any disclaimer, the term of this patent is extended or adjusted under 35 U.S.C. 154(b) by 0 days.

(21) Appl. No.: 17/174,819

(22) Filed: Feb. 12, 2021

Related U.S. Application Data

(60) Provisional application No. 62/975,963, filed on Feb. 13, 2020.

(51) Int. Cl.
*D06P 3/24* (2006.01)
*D06P 1/39* (2006.01)

(52) U.S. Cl.
CPC .............. *D06P 3/241* (2013.01); *D06P 1/39* (2013.01)

(58) Field of Classification Search
CPC .................................. D06P 3/241; D06P 1/39
See application file for complete search history.

(56) References Cited

U.S. PATENT DOCUMENTS

| | | | | |
|---|---|---|---|---|
| 5,660,889 A | * | 8/1997 | Elgarhy | D06M 15/6436 442/127 |
| 6,443,998 B1 | * | 9/2002 | Jones | D06P 1/39 8/639 |
| 2014/0256468 A1 | * | 9/2014 | Tutmark | A63B 37/0074 473/371 |
| 2019/0125028 A1 | * | 5/2019 | Bartel | A43B 23/024 |

FOREIGN PATENT DOCUMENTS

WO    WO-2014063028 A1 *    4/2014    ............... D06P 1/16

* cited by examiner

*Primary Examiner* — Amina S Khan
(74) *Attorney, Agent, or Firm* — Ballard Spahr LLP

(57) ABSTRACT

Disclosed are a composition and process useful for the trichromatic dyeing of polyamide textile fibers. The composition has a yellow component, a red component and a blue component and wherein the red component includes the mixture of Acid Red 361 and Acid Red 419.

16 Claims, No Drawings

TRICHROMATIC FIBER DYEING PROCESSES AND COMPOSITIONS THEREOF

CROSS-REFERENCE TO RELATED APPLICATIONS

This application claims the benefit of U.S. Provisional Application No. 62/975,963 filed Feb. 13, 2020, which is incorporated herein by reference in its entirety.

TECHNICAL FIELD

The invention relates to processes for the trichromatic dyeing of polyamide textile fibers. The invention further pertains to compositions useful for the trichromatic dyeing of polyamide fibers.

BACKGROUND

Dyestuffs are commonly utilized in a combination of three primary colorants e.g., red yellow and blue, to provide the majority of the shades most often utilized to dye textile, specifically polyamide, fibers. Such a three dye combination is known as a "trichromy" and the related dyeing processes are known as "trichromatic dyeing." In formulating trichromatic dyeing formulations, the dye selection may focus on the specific dyes which will provide the most uniform dyeing rates. That is, it is usually desirable for the exhaustion rates for the red, yellow and blue dyes to be comparable so that the dye take up will be fairly uniform for each of the colors.

Manufacturers of dyestuffs often supply dyes to textile manufacturers in pure product form. Pure forms of dyestuffs are classified for identification by Color Index (CI) number. This system was developed by the American Association of Textile Chemists and Colorists (AATCC) to allow more uniform identification of dyestuff identity to the end user. Such dyes are sometimes called "standards." While pure dyes have some application for the dyeing of polyamide fibers, it is not uncommon for such pure dyestuffs to provide inferior dyeing performance in trichromatic dyeing processes.

Manufacturers also supply dyes in mixtures of pure forms. Mixtures can be to the pure form of the dyestuffs for reasons related to the shade desired and/or performance properties.

In selecting dyes for use in trichromatic dyeing, it is important that the color components be sufficiently compatible from a performance standpoint to allow them to effectively dye polyamide fibers in a trichromatic system. Such compatibility can relate to those dyes that provide uniform strike, build and exhaustion during the dyeing operation and to be able to reproduce the coloration in a consistent manner from batch to batch. Moreover, it can be exceedingly difficult to predict the particular performance of a dye, especially when the dye is combined with other dyes in a trichromatic process. Additionally, even though the performance of the dyed fiber may be initially acceptable, it has been seen that application of a stain resist chemical may reduce the lightfastness of the dyed fiber.

In addition, it is desired that the final carpet be environmentally friendly. This can only be accomplished if also the dyes in the carpet are environmentally friendly.

In light of the above, it would be desirable to develop a trichromatic dyeing process which utilizes dyes that are all environmentally friendly, while still providing both excellent build properties and lightfastness characteristics. Furthermore, it would be desirable to develop an environmentally friendly trichromatic dyeing process which provides such has desired properties in lightfastness even when a stainblocking chemical is applied to the dyed fiber.

SUMMARY

Disclosed herein is a composition useful for the trichromatic dyeing of polyamide textile fibers. The composition comprises a yellow component, a red component and a blue component and wherein the red component comprises a mixture of Acid Red 361 and Acid Red 419.

Also disclosed herein is a process for the trichromatic dyeing of polyamide textile fibers. The process can be a continuous process. The process can comprises the steps of:

a) providing at least one polyamide fiber; and b) contacting the at least one polyamide fiber with an aqueous dye solution comprising a yellow component, a red component and a blue component, wherein the red component comprises a mixture of Acid Red 361 and Acid Red 419, thereby providing a dyed fiber.

Additional aspects of the invention will be set forth, in part, in the detailed description, figures, and claims, which follow, and in part will be derived from the detailed description, or can be learned by practice of the invention. It is to be understood that both the foregoing general description and the following detailed description are exemplary and explanatory only and are not restrictive of the invention as disclosed.

DETAILED DESCRIPTION

The present invention can be understood more readily by reference to the following detailed description, examples, drawings, and claims, and their previous and following description. However, before the present articles, systems, and/or methods are disclosed and described, it is to be understood that this invention is not limited to the specific or exemplary aspects of articles, systems, and/or methods disclosed unless otherwise specified, as such can, of course, vary. It is also to be understood that the terminology used herein is for the purpose of describing particular aspects only and is not intended to be limiting.

The following description of the invention is provided as an enabling teaching of the invention in its best, currently known embodiment. To this end, those skilled in the relevant art will recognize and appreciate that many changes can be made to the various aspects of the invention described herein, while still obtaining the beneficial results of the present invention. It will also be apparent that some of the desired benefits of the present invention can be obtained by selecting some of the features of the present invention without utilizing other features. Accordingly, those of ordinary skill in the pertinent art will recognize that many modifications and adaptations to the present invention are possible and may even be desirable in certain circumstances and are a part of the present invention. Thus, the following description is again provided as illustrative of the principles of the present invention and not in limitation thereof.

Definitions

In this specification and in the claims that follow, reference will be made to a number of terms, which shall be defined to have the following meanings:

Throughout the description and claims of this specification the word "comprise" and other forms of the word, such as "comprising" and "comprises," means including but not limited to, and is not intended to exclude, for example, other additives, components, integers, or steps. Furthermore, it is to be understood that the terms comprise, comprising and comprises as they related to various aspects, elements and features of the disclosed invention also include the more limited aspects of "consisting essentially of" and "consisting of."

As used herein, the singular forms "a," "an" and "the" include plural referents unless the context clearly dictates otherwise. Thus, for example, reference to a "surface" includes aspects having two or more such surfaces unless the context clearly indicates otherwise.

Ranges can be expressed herein as from "about" one particular value, and/or to "about" another particular value. When such a range is expressed, another aspect includes from the one particular value and/or to the other particular value. Similarly when values are expressed as approximations, by use of the antecedent "about," it will be understood that the particular value forms another aspect. It will be further understood that the endpoints of each of the ranges are significant both in relation to the other endpoint, and independently of the other endpoint.

A weight percent of a component, unless specifically stated to the contrary, is based on the total weight of the formulation or composition in which the component is included. Further, unless otherwise noted, weight percent are expressed as dry weight.

Unless otherwise stated, the dye names set forth herein conform to the dyes listed in the Colour Index International, 4th Ed., published by The Society of Dyers and Colourists, which is incorporated herein by reference, particularly for its disclosure of dye names. One of ordinary skill in the art will recognize that this publication generally serves to define the standard names for dyes utilized in the textile industry.

As used herein, the terms "optional" or "optionally" mean that the subsequently described event or circumstance may or may not occur, and that the description includes instances where said event or circumstance occurs and instances where it does not.

Throughout this document, where publications are referenced, the disclosures of these publications in their entireties are hereby incorporated by reference in order to more fully describe the state of the art to which this invention pertains.

Composition and Process for Trichromatic Dyeing

Disclosed herein is a composition for dyeing polyamide fibers, wherein the composition comprises a yellow component, a red component and a blue component and wherein the red component comprises a mixture of Acid Red 361 and Acid Red 419.

Disclosed herein is a process for the trichromatic dyeing of polyamide textile fibers wherein the process comprises the steps of:
 a) providing at least one polyamide fiber; and
 b) contacting the at least one polyamide fiber with an aqueous dye solution comprising a yellow component, a red component and a blue component, wherein the red component comprises a mixture of Acid Red 361 and Acid Red 419, thereby providing a dyed fiber.

In one aspect, the red component essentially consists of a mixture of Acid Red 361 and Acid Red 419. For example, the red component can consist of a mixture of Acid Red 361 and Acid Red 419.

In one aspect, the composition for dyeing polyamide fibers and the aqueous dye solution comprising a yellow component, a red component and a blue component, wherein the red component comprises a mixture of Acid Red 361 and Acid Red 419, thereby providing a dyed fiber that only consists of dyes that are environmentally friendly. In an non-limiting example, the yellow component, the red component, and the blue component used herein do not comprise a molecule comprising fluorine. The use of such components for the trichromatic build that allows for a completely fluorine free carpet product. The use of a fluorine free dyestuffs allows for the carpet to pass elemental fluorine testing.

As a trichromatic blend, the strike rate of the acid red blend disclosed herein should match the strike rate of any acid yellow (blend) and acid blue (blend) such that the color is built on tone. An on tone build ensure better color repeatability and sidematch performance. Key feature is attaining a degree of levelness during the dyeing process where shade consistency is maintained. The shade is built on tone meaning it starts off light X color, builds to X color, having little to no variation in yellow, red, blue hues while attaining that color. This is accomplished with the trichromatic blend disclosed herein containing only fluorine free dyes.

In one aspect, the composition for dyeing polyamide fibers and the aqueous dye solution comprising a yellow component, a red component and a blue component, wherein the red component comprises a mixture of Acid Red 361 and Acid Red 419, produces results having a desired lightfastness. For example, the lightfastness can be a lightfastness from 2 to 5, from 2.5 to 5, from 3.0 to 5, or from 3.5 to 5.

The yellow and blue dye components which are suitable for use in combination with the red component comprising a mixture of Acid Red 361 and Acid Red 419 as disclosed herein, include any yellow and blue dyes which are at least partially compatible with the red component comprising a mixture of Acid Red 361 and Acid Red 419. To this end, compatibility can be readily determined by interrupting the dyeing process and examining the color build characteristics of the partially dyed fiber. As such, the determination of compatibility between various dyes would be a matter of routine experimentation to those skilled in the art.

In one aspect, the red component comprises from about 20 part to about 80 parts of Acid Red 361 and from about 20 parts to about 80 parts of Acid Red 419 to provide 100 total parts dye in the red component. For example, the red component comprises from about 30 part to about 70 parts of Acid Red 361 and from about 30 parts to about 70 parts of Acid Red 419 to provide 100 total parts dye in the red component. In another example, the red component comprises from about 40 part to about 60 parts of Acid Red 361 and from about 40 parts to about 60 parts of Acid Red 419 to provide 100 total parts dye in the red component. In yet another example, the red component comprises from about 50 parts to about 60 parts of Acid Red 361 and from about 50 parts to about 40 parts of Acid Red 419 to provide 100 total parts dye in the red component. In yet another example, the red component comprises from about 55 parts to about 57 parts of Acid Red 361 and from about 45 parts to about 43 parts of Acid Red 419 to provide 100 total parts dye in the red component.

In one aspect, the red component comprises Acid Red 361 and Acid Red 419, wherein Acid Red 361 is present from about 20 part to about 80 parts of 100 total parts dye in the red component. For example, the red component comprises Acid Red 361 and Acid Red 419, wherein Acid Red 361 is present from about 30 part to about 70 parts of 100 total parts dye in the red component. In another example, the red component comprises Acid Red 361 and Acid Red 419, wherein Acid Red 361 is present from about 40 part to about 60 parts of 100 total parts dye in the red component. In yet another example, the red component comprises Acid Red 361 and Acid Red 419, wherein Acid Red 361 is present from about 50 part to about 60 parts of 100 total parts dye in the red component. In yet another example, the red component comprises Acid Red 361 and Acid Red 419, wherein Acid Red 361 is present from about 55 part to about 57 parts of 100 total parts dye in the red component.

In one aspect, the red component comprises Acid Red 361 and Acid Red 419, wherein Acid Red 419 is present from about 20 part to about 80 parts of 100 total parts dye in the red component. For example, the red component comprises Acid Red 361 and Acid Red 419, wherein Acid Red 419 is present from about 30 part to about 70 parts of 100 total parts dye in the red component. In another example, the red component comprises Acid Red 361 and Acid Red 419, wherein Acid Red 419 is present from about 40 part to about 60 parts of 100 total parts dye in the red component. In yet another example, the red component comprises Acid Red 361 and Acid Red 419, wherein Acid Red 419 is present from about 40 part to about 50 parts of 100 total parts dye in the red component. In yet another example, the red component comprises Acid Red 361 and Acid Red 419, wherein Acid Red 419 is present from about 45 part to about 43 parts of 100 total parts dye in the red component.

In one aspect, the blue component comprises one or more of a dye selected from the group consisting of: Acid Blue 25; Acid Blue 40; Acid Blue 41, Acid Blue 78; Acid Blue 129; Acid Blue 205; Acid Blue 260; Acid Blue 277; Acid Blue 288; Acid Blue 324; Acid Green 25, or a mixture thereof. For example, the blue component can comprise Acid Blue 324.

In one aspect, the red component further comprises one or more of a dye selected from the group consisting of: Acid Red 257; Acid Red 396; Acid Red 426, or a mixture thereof. For example, the red component can further comprise Acid Red 257. In another example, the red component can further comprise Acid Red 396. In another example, the red component further comprises Acid Red 426.

In one aspect, the yellow component can be selected from the group consisting of Acid Yellow 49; Acid Yellow 135; Acid Yellow 159; Acid Yellow 159:1; Acid Yellow 174; Acid Yellow 199; Acid Yellow 216; Acid Yellow 219, Acid Yellow 219:1; Acid Yellow 230; Acid Yellow 240; Acid Orange 47; Acid Orange 67; Acid Orange 116; Acid Orange 152, Acid Orange 156, or a mixture thereof. In one example, the yellow component can comprise Acid Yellow 199 and Acid Orange 156.

In one aspect, the yellow component comprises Acid Orange 156 and Acid Yellow 199, and the blue component comprises Acid Blue Acid Blue 324.

In one aspect, the yellow component comprises from about 80 parts to about 20 parts of the Acid Orange 156 and from about 80 parts to about 20 parts of the Acid Yellow 199 to provide 100 total parts dye in the yellow component. In a further embodiment, the yellow component comprises from about 60 parts to about 40 parts of the Acid Orange 156 and from about 60 parts to about 40 parts of the Acid Yellow 199 to provide 100 total parts dye in the yellow component.

This particular mixture of Acid Orange 156 and Acid Yellow 199 is referred to herein as "Orange TC." In a further embodiment, the yellow component comprises from about 45 parts to about 55 parts of the Acid Orange 156 and from about 45 parts to about 55 parts of the Acid Yellow 199 to provide 100 total parts dye in the yellow component. In a still further embodiment, the yellow component comprises from about 48 parts to about 52 parts of the Acid Orange 156 and from about 48 parts to about 52 parts of the Acid Yellow 199 to provide 100 total parts dye in the yellow component.

In another aspect, equal parts of Acid Orange 156 to Acid Yellow 199 are utilized. In accordance with the methods and compositions herein, it has been found that the these ratios of these dyes making up the Orange TC dye mixture does not vary based on desired depth of shade or the target color of the polyamide fiber to be dyed.

In making the dye baths for use in the process disclosed herein, the red, blue and yellow dye components are introduced into an aqueous solution by techniques well recognized in the art. For example, the dyes, in powder form, can be introduced into water to provide the desired solution. The amount of yellow, red and blue components employed in the dye bath is dependent on desired color of the dyed fiber and, as such, optimization would be within the purview of those skilled in the art. In one aspect, the amount of the components employed in the aqueous solution is selected to provide a dye take up (based on 100% exhaustion) of about 0.0001% of owf (on weight fiber) to about 2.0% owf for each of the yellow, red and blue components. For example, in dyeing nylon 6 or 66 fibers, the amount of the yellow component is about 0.01 to about 0.03% owf with the blue component being about 0.03% owf to about 0.05% owf and the red component being about 0.01% owf to about 0.03% owf. The aqueous dye solution can further comprise one or more of a leveling agent, a wetting agent, a buffering agent, and a water treatment agent. Still further, the invention further provides treating the dyed fiber with a stainblocking agent, wherein the stainblocking agent is applied at a pH of from about 0.5 to 3.0. In one aspect, the stainblocking agent may be applied at a pH of 0.5, 1.0, 1.5, 2.0, 2.5, or 3.0. In accordance with the methods herein, it has been surprisingly found that with the Orange TC as a yellow component, lightfastness of a trichromatic dyed fiber can be improved even when a stainblocking agent is utilized. The choice of a particular stainblocking agent is dependent of the particular fiber being treated. For example, in treating nylon, suitable agents include AP63 from Polymer Solutions Group and S815 from Invista.

The selection of, and amounts for, each of the additional agents would be dependent on the particular dye bath/fiber combination and the need for the relative function of the particular agent in question. As such, determination of optimal amounts for each agent would be within the purview of those skilled in the art.

The dye solutions disclosed herein can be employed in dyeing any polyamide fiber recognized in the art. Specific examples of suitable fibers include polyamide textile fibers of nylon 6 and nylon 66. Moreover, the dye solution finds particular utility in dyeing fibers used in forming carpets and carpet products.

In this aspect, the dye solution can be used in connection with both continuous and batch dyeing processes and can include any process recognized in the art. Although such processes are known in the art and as such need not be described in detail here, the following information regarding certain suitable processes is provided for sake of completeness.

For example, the processes may be conducted in a continuous dyeing processes. In a non-exclusive list, the following steps may be conducted in accordance with the continuous dyeing processes contemplated herein: (a) a polyamide fiber is sewed onto a backing to provide a dyeable material; (b) the lint is extracted; (c) the material is passed through a web guider; (d) the material is passed through a pre-steamer; (e) optionally the material is pre-wet and/or extracted; (f) the material from (d) or optionally (e) is passed through a dye applicator (Kusters Fluldyer, Fleissner overflow applicator); (g) the material is passed through a vertical steamer; (h) the material is rinsed and/or extracted; (i) stainblocking application (Kusters Flexnip or Kusters Fluicon); (j) the material is passed through a web guider; (k) the material is passed through a vertical steamer; (l) the material rinsed and/or extracted; (m) a soil protectant, such as a fluorochemical (via spray bar, or foam applicator) is applied; (n) the material is passed through a dryer and/or tenter; (o) the material is cooled; and (p) the material is cut and accumulated. One of ordinary skill in the art will recognize that a number of the steps enumerated previously may be omitted or are optional and also that the steps need not necessarily be performed in the stated order.

In one aspect, the batch dyeing processes can be utilized. One of ordinary skill in the art will recognize that batch (or exhaust) dyeing refers to a process by which colorants are applied to a substrate using a closed system. In one example of a batch dyeing process, the substrate to be colored, along with the colorants, auxiliary chemicals (including stainblocker), and medium for colorant transfer (usually water) are each added to a closed vessel. The vessel and contents are then heated using the appropriate time and temperature profile that will allow exhaustion of the colorants onto the substrate in a uniform fashion, so that a level dyeing results. In the case of nylon, which can be dyed at temperatures below the boiling point of water, the vessel can be open to the atmosphere. When higher temperatures must be utilized, the vessel can be designed to allow pressurization. In one example of the batch dyeing method, the liquor to goods ratio is from about 10:1 to about 80:1, with an exemplary ratio being from about 15:1 to about 25:1.

In one aspect, the fibers may be skein dyed. In accordance with this method, skeins of carpet yarn are mounted on a holding device. The holding device is then lowered into a rectangular vessel containing the dyebath.

Examples

The following protocol was used for the procedures for evaluations of the dye combinations:
1. Ahiba/Exhaust study/Exhaust dye trichromatic build study is used to evaluate the on tone build through the dye cycle
2. Evaluation is usually a medium grey or beige shade
3. Chose Yellow, Red, and Blue dyestuff combination along with the chemical and pH needed to achieve the formula
4. Weigh up dye and chemicals selection needed for 7 test at a liquor ration of 28:1 bulk with tap water, set the pH of the solutions
5. Take choice of greige goods and weigh up 28.6 grams of 6 samples
6. Using the 1000 ml cylinder for the Ahiba (exhaust) machine, weigh 800 ml from you bulk solution into each of the (6) cylinders.
7. Add the greige goods and start the machine (Program #1=210 F for 15 minutes)
8. The (6) samples will be pulled from Ahiba when temperature in Fahrenheit reaches 100 F, 125 F, 150 F, 175 F, 200 F & 210 F/15 minutes
9. Rinse/Extract/& dry samples at Approximately 250 F/8 minutes
10. Let Ahiba cool back to 85 F then add 6 more greige goods to each tube's bath
11. Run Program #1 again to capture all remaining dye in bath on a piece of greige
12. Pull all 6 samples after machine has completed the cycle 210 F/15 minutes
13. Rinse/Extract/& dry samples at approximately 250 F for 8 minutes
14. Let samples condition back for approximately 1 hour
15. Evaluate the on-tone trichromatic build through the dye cycle noting yellow, red, and blue tendencies as temperature rises on the patches The following protocol was used for the evaluations of dye combinations:
1. Continuous dye application (Flessiner)-Time/Temperature Study
2. Weight up formula usually medium grey or beige for 13 liters with the chemicals needed and pH
3. Cut (6) sample of greige goods approximately 8"×12"
4. Pour dye solution in to Flessiner set wet pick-up to 400%
5. Pre-steam greige goods for 20 seconds at 208 F
6. Put greige on Flessiner belt and start machine
7. After samples in dyed place it into the vertical FPA steamer for a period of
8. Sample #1=30 seconds
9. Sample #2=1 minute
10. Sample #3=2 minute
11. Sample #4=3 minute
12. Sample #5=4 minute
13. Sample #6=5 minute
14. Sample #6 run (2) 18"×36" pieces to have coated and sent for fastness testing.
15. All samples rinse/extract/dry 250 F for 8 minutes
16. Evaluate for uniformity and trichromatic build, noting yellow, red, and blue tendencies in the carpet The following protocol was used for the evaluations of dye combinations:
1. Continuous dye application (Flessiner)-Strike Rate Study
2. Weigh up formula usually Dark grey or brown for 13 liters with the chemicals needed and pH
3. Pour dye solution in to Flessiner set wet pick-up to 400%
4. Cut greige goods in 8" W×14" L pieces/pre-steam for 20 seconds
5. Lay on the Flessiner belt covering all of sample except 8"×5" with plastic template, which blocks dyebath application onto the greige
6. Run sample thru the Fleissner, remove the plastic and place in the vertical steamer
7. Stop steamer when sample is hanging vertically and leave in machine for 5 minutes
8. Return/rinse/extract/dry 250 F/10 minutes
9. Evaluate the region of the dyed and undyed areas for strike rate of the chosen dyestuffs to each other, noting yellow, red, and blue tendencies.

Various lightfastness tests were performed and the results are shown in Table 2. For the data presented in Table 2, the following materials were used as shown in Table 1. Greige A-D are identical in construction. Samples 1-4 and 9-12 are control samples in Table 2, and samples 5-8 and 13-16 are samples of compositions disclosed herein.

The lightfastness tests described herein uses the AATCC Gray Scale Test to evaluate the performance of the samples. The AATCC Gray Scale Test is a physical mechanism of graded color differential chips whereby the difference in two color chips is given a number. The scale is physically placed between a control and tested piece and regardless of what color the test material is, the difference is extrapolated from the test pieces to the AATCC Gray Scale Test. Samples are given a numerical value between 1 to 5 in the AATCC Gray Scale Test, where a 5 is a perfect. The closer score to 5 the better the sample performed in the test.

40 hours and 60 hours lightfastness tests are determined by exposing samples to a Xenon-arc lamp for 40 and 60 hours to generate a color loss that is graded on the AATCC Gray Scale Test. This is defined by AATCC test TM16.3.

The ozone ($O_3$) lightfastness test is determined by exposing samples to a gas bath of ozone ($O_3$) which generates a color loss. 2 cycles of exposure are required. The test is defined by AATCC test TM129-11. It is graded on the AATCC Gray Scale Test.

The NOx lightfastness test is determined by exposing samples to a gas bath of nitrous oxide ($N_2O$), which generates a color loss, and simulates issues with textile products in the field. Two cycles of exposure are required. The test is defined by AATCC test TM164. It is graded on the AATCC Gray Scale Test.

The topical red fade lightfastness test is determined by exposing samples to a high humidity and high temperature atmosphere for the purpose of generating color loss due to the products own acidity influenced color loss. It is a measure of color loss due to high humidity areas of the country. It is graded on the AATCC Gray Scale Test.

Table 2 also shows data related to Tap Water Repellency, Float Time, and %-Sink. Tap Water Repellency is a test that determines the ability of a textile sample, such as the carpets tested here, to bead a drop of water on its surface, not allowing for the water to penetrate into the pile. It is a desired quality of a hydrophobic product. High times are desired, in excess of 5 minutes. Float time is an internal test where the carpet is placed face down into a bath of water and the carpet should not sink into the water layer much, if at all, for some period of time. High times are desired, in excess of 2 minutes. % Sink is the amount of pile that does penetrate the surface of the water, face down in the water, at the 2 minute mark. A 0% sink is desired.

TABLE 1

| Sample Name | Material |
|---|---|
| MB325 | Nylon 6.6 |
| MB334 | Nylon 6.6 |
| M4682 | Nylon 6 |
| MA123 | Nylon 6 |

TABLE 2

| Sample No. | 1 | 2 | 3 | 4 |
|---|---|---|---|---|
| Style | MB325 | MB334 | M4682 | MA123 |
| Greige | A | B | C | D |
| Weight (oz.) | 46 | 56 | 25 | 25 |
| Color | Grey | Grey | Grey | Grey |
| Fluorinated Dyes-Control | g/l | g/l | g/l | g/l |
| Acid Orange (mix of Acid Orange 156 and Acid Yellow 199) | 0.0221 | 0.0221 | 0.0221 | 0.0221 |
| Acid Red (mix of Acid Red 426, Acid Red 266, and Acid Yellow 199) | 0.0178 | 0.0178 | 0.0178 | 0.0178 |
| Acid Blue (Acid Blue 324) | 0.0396 | 0.0396 | 0.0396 | 0.0396 |
| Non-Fluorinated Dyes | | | | |
| Acid Orange (mix of Acid Yellow 199 and Acid Yellow 219) | — | — | — | — |
| Acid Red 419 | — | — | — | — |
| Acid Red 361 | — | — | — | — |
| Acid Blue 324 | — | — | — | — |
| SST Apply @ 300% pu | g/l | g/l | g/l | g/l |
| Stain blocker | 13.33 | 13.33 | 13.33 | 13.33 |
| Repellent | 3.33 | 3.33 | 3.33 | 3.33 |
| pH | 1.65 | 1.65 | 1.65 | 1.65 |
| Testing | | | | |
| Tap water repellency (time) | 5+ min. | 5+ min. | 5+ min. | 5+ min. |
| Float (time) | 2 min. | 2 min. | 2 min. | 2 min. |
| Float (%-Sink) | 0% | 0% | 0% | 0% |
| Lightfastness Testing | | | | |
| 40 hrs. Lightfastness | 3 | 3 | 2.5 | 2.5 |
| 60 hrs. Lightfastness | 3 | 3 | 2.5 | 2 |
| Ozone (2 cycles) | 3.5 | 3.5 | 3 | 3 |
| NOx (2 cycles) | 2.5 | 2.5 | 2 | 2 |
| Tropical Red Fade | 3.5 | 3.5 | 3.5 | 3.5 |

TABLE 2-continued

| Sample No. | 5 | 6 | 7 | 8 |
|---|---|---|---|---|
| Style | MB325 | MB334 | M4682 | MA123 |
| Greige | A | B | C | D |
| Weight (oz.) | 46 | 56 | 25 | 25 |
| Color | Grey | Grey | Grey | Grey |
| Fluorinated Dyes-Control | g/l | g/l | g/l | g/l |
| Acid Orange (mix of Acid Orange 156 and Acid Yellow 199) | — | — | — | — |
| Acid Red (mix of Acid Red 426, Acid Red 266, and Acid Yellow 199) | — | — | — | — |
| Acid Blue (Acid Blue 324) | — | — | — | — |
| Non-Fluorinated Dyes | | | | |
| Acid Orange (mix of Acid Yellow 199 and Acid Yellow 219) | 0.0240 | 0.0240 | 0.0240 | 0.0240 |
| Acid Red 419 | 0.0081 | 0.0081 | 0.0081 | 0.0081 |
| Acid Red 361 | 0.0104 | 0.0104 | 0.0104 | 0.0104 |
| Acid Blue 324 | 0.0400 | 0.0400 | 0.0400 | 0.0400 |
| SST Apply @ 300% pu | g/l | g/l | g/l | g/l |
| Stain blocker | 13.33 | 13.33 | 13.33 | 13.33 |
| Repellent | 3.33 | 3.33 | 3.33 | 3.33 |
| pH | 1.65 | 1.65 | 1.65 | 1.65 |
| Testing | | | | |
| Tap water repellency (time) | 5+ min. | 5+ min. | 5+ min. | 5+ min. |
| Float (time) | 2 min. | 2 min. | 2 min. | 2 min. |
| Float (%-Sink) | 0% | 0% | 0% | 0% |
| Lightfastness Testing | | | | |
| 40 hrs. Lightfastness | 2.5 | 2.5 | 2 | 2 |
| 60 hrs. Lightfastness | 2 | 2.5 | 2 | 2 |
| Ozone (2 cycles) | 3.5 | 3.5 | 3 | 3 |
| NOx (2 cycles) | 2.5 | 2.5 | 2 | 2 |
| Tropical Red Fade | 3.5 | 3.5 | 3.5 | 3.5 |

| Sample No. | 9 | 10 | 11 | 12 |
|---|---|---|---|---|
| Style | MB325 | MB334 | M4682 | MA123 |
| Greige | A | B | C | D |
| Weight (oz.) | 46 | 56 | 25 | 25 |
| Color | Tan | Tan | Tan | Tan |
| Fluorinated Dyes-Control | g/l | g/l | g/l | g/l |
| Acid Orange (mix of Acid Orange 156 and Acid Yellow 199) | 0.0488 | 0.0488 | 0.0488 | 0.0488 |
| Acid Red (mix of Acid Red 426, Acid Red 266, and Acid Yellow 199) | 0.0149 | 0.0149 | 0.0149 | 0.0149 |
| Acid Blue (Acid Blue 324) | 0.023 | 0.0230 | 0.0230 | 0.0230 |
| Non-Fluorinated Dyes | | | | |
| Acid Orange (mix of Acid Yellow 199 and Acid Yellow 219) | — | — | — | — |
| Acid Red 419 | — | — | — | — |
| Acid Red 361 | — | — | — | — |
| Acid Blue 324 | — | — | — | — |
| SST Apply @ 300% pu | g/l | g/l | g/l | g/l |
| Stain blocker | 13.33 | 13.33 | 13.33 | 13.33 |
| Repellent | 3.33 | 3.33 | 3.33 | 3.33 |
| pH | 1.65 | 1.65 | 1.65 | 1.65 |
| Testing | | | | |
| Tap water repellency (time) | 5+ min. | 5+ min. | 5+ min. | 5+ min. |
| Float (time) | 2 min. | 2 min. | 2 min. | 2 min. |
| Float (%-Sink) | 0% | 0% | 0% | 0% |
| Lightfastness Testing | | | | |
| 40 hrs. Lightfastness | 3 | 3 | 2.5 | 3 |
| 60 hrs. Lightfastness | 2.5 | 3 | 2.5 | 3 |

TABLE 2-continued

| | | | | |
|---|---|---|---|---|
| Ozone (2 cycles) | 3.5 | 3.5 | 2.5 | 3 |
| NOx (2 cycles) | 2.5 | 3 | 2 | 2.5 |
| Tropical Red Fade | 3.5 | 3.5 | 3.5 | 3.5 |

| Sample No. | 13 | 14 | 15 | 16 |
|---|---|---|---|---|
| Style | MB325 | MB334 | M4682 | MA123 |
| Greige | A | B | C | D |
| Weight (oz.) | 46 | 56 | 25 | 25 |
| color | Tan | Tan | Tan | Tan |
| Fluorinated Dyes-Control | g/l | g/l | g/l | g/l |
| Acid Orange (mix of Acid Orange 156 and Acid Yellow 199) | — | — | — | — |
| Acid Red (mix of Acid Red 426, Acid Red 266, and Acid Yellow 199) | — | — | — | — |
| Acid Blue (Acid Blue 324) | — | — | — | — |
| Non-Fluorinated Dyes | | | | |
| Acid Orange (mix of Acid Yellow 199 and Acid Yellow 219) | 0.0530 | 0.0530 | 0.0530 | 0.0530 |
| Acid Red 419 | 0.0068 | 0.0068 | 0.0068 | 0.0068 |
| Acid Red 361 | 0.0087 | 0.0087 | 0.0087 | 0.0087 |
| Acid Blue 324 | 0.0232 | 0.0232 | 0.0232 | 0.0232 |
| SST Apply @ 300% pu | g/l | g/l | g/l | g/l |
| Stain blocker | 13.33 | 13.33 | 13.33 | 13.33 |
| Repellent | 3.33 | 3.33 | 3.33 | 3.33 |
| pH | 1.65 | 1.65 | 1.65 | 1.65 |
| Testing | | | | |
| Tap water repellency (time) | 5+ min. | 5+ min. | 5+ min. | 5+ min. |
| Float (time) | 2 min. | 2 min. | 2 min. | 2 min. |
| Float (%-Sink) | 0% | 0% | 0% | 0% |
| Lightfastness Testing | | | | |
| 40 hrs. Lightfastness | 2.5 | 2.5 | 2 | 2 |
| 60 hrs. Lightfastness | 2 | 2 | 2 | 2 |
| Ozone (2 cycles) | 3.5 | 3 | 2.5 | 3.5 |
| NOx (2 cycles) | 2.5 | 3 | 2.5 | 2.5 |
| Tropical Red Fade | 3.5 | 3.5 | 3.5 | 3.5 |

The data presented in Table 2 shows that the dye blend not containing elemental fluorine (a mixture of Acid Red 419 and Acid Red 361) have comparable lightfastness properties as conventional dye blends that do contain fluorine. As such, a more sustainable dye blend can be used to produce carpets having acceptable lightfastness properties that are comparable with the conventional dye blends that do contain fluorine used in current processes.

The trichromatic build for various acid reds and combinations of acid reds were tested. The trichromatic build is a subjective rating on a 1-5 scale, where a 5 is a perfect trichromatic build. Trichromatic build means the yellow, red, and blue dyes exhaust onto the material evenly during the temperature and time curves the product sees during manufacturing. Trichromatic build is a desired quality of a dye system to ensure levelness and color consistency. In these tests, dye blends were produced using the acid orange and acid blue dyes used in Table 2 but with varying acid reds, all being fluorine free dyes. The control for his experiment was the conventional blend of dyes as indicated in Table 2. The amounts of the various dyes were as described in Table 2. The non-fluorinated acid red dyes that were evaluated for their trichromatic build are shown in Table 3.

TABLE 3

| Acid Red and Acid Red Blends | Trichromatic Build (AATCC Gray Scaling Rating) |
|---|---|
| Control Acid Red blend (mix of Acid Red 426, Acid Red 266, and Acid Yellow 199) | 4.5 |
| Blend of Acid Red 361 and Acid Red 419 | 4.0 |
| Acid Red 361 | 3.0 |
| Acid Red 419 | 3.0 |
| Acid Red 42 | 2.5 |
| Acid Red 57 | 2.0 |

The invention claimed is:
1. A process for trichromatic dyeing of polyamide textile fibers wherein the process comprises the steps of:
   a) providing at least one polyamide fiber; and
   b) contacting the at least one polyamide fiber with an aqueous dye solution comprising a yellow component, a red component and a blue component, wherein the red component consists of a mixture of Acid Red 361 and Acid Red 419, wherein the aqueous dye solution does not comprise Acid Orange 156, thereby providing a dyed polyamide fiber, wherein the yellow component, the red component and the blue component have matching strike rates to produce a trichromatic build from 3.0 to 5.0 as determined by the AATCC Gray Scaling Rating in the dyed polyamide fiber, wherein the combination of Acid Red 361 and Acid Red 419 in the aqueous dye solution produces a higher trichromatic build in the dyed polyamide fiber as determined by the AATCC Gray Scaling Rating as compared to an identical aqueous dye solution except that Acid Red 361 or Acid Red 419 is used individually and not in combination as the red component in the aqueous dye solution, wherein the yellow component, the blue component, and the red component do not comprise a molecule comprising fluorine.

2. The process of claim 1, wherein the blue component comprises one or more of a dye selected from the group consisting of: Acid Blue 25: Acid Blue 40; Acid Blue 41, Acid Blue 78: Acid Blue 129: Acid Blue 205; Acid Blue 260; Acid Blue 277: Acid Blue 288; Acid Blue 324: Acid Green 25, or a mixture thereof.

3. The process of claim 1, wherein the red component consists of from about 20 parts to about 80 parts of Acid Red 361 and from about 20 parts to about 80 parts of Acid Red 419 to provide 100 total parts dye in the red component.

4. The process of claim 1, wherein the red component consists of from about 55 parts to about 57 parts of Acid Red 361 and from about 45 parts to about 43 parts of Acid Red 419 to provide 100 total parts dye in the red component.

5. The process of claim 1, wherein the aqueous dye solution further comprises one or more of a wetting agent, a leveling agent, a buffering agent, a lightfastness enhancing agent and a water treatment agent.

6. The process of claim 1, wherein the yellow component comprises one or more of a dye selected from the group consisting of Acid Yellow 49; Acid Yellow 135; Acid Yellow 159; Acid Yellow 159:1: Acid Yellow 174; Acid Yellow 199; Acid Yellow 216; Acid Yellow 219, Acid Yellow 219:1; Acid Yellow 230; Acid Yellow 240; Acid Orange 47; Acid Orange 67; Acid Orange 116; Acid Orange 152, or a mixture thereof.

7. The process of claim 1, wherein the yellow component consists of Acid Yellow 199 and Acid Yellow 219.

8. The process of claim 7 wherein the blue component consists of Acid Blue 324.

9. A composition for dyeing polyamide fibers to provide dyed polyamide fibers, wherein the composition comprises an aqueous dye solution comprising a yellow component, a red component and a blue component, wherein the red component consists of a mixture of Acid Red 361 and Acid Red 419, wherein the aqueous dye solution does not comprise Acid Orange 156, wherein the yellow component, the red component, and the blue component do not comprise a molecule comprising fluorine, wherein the composition is configured such that the yellow component, the red component and the blue component have matching strike rates to produce a trichromatic build from 3.0 to 5.0 as determined by the AATCC Gray Scaling Rating in the dyed polyamide fibers, wherein the combination of Acid Red 361 and Acid Red 419 in the aqueous dye solution produces a higher trichromatic build in the dyed polyamide fiber as determined by the AATCC Gray Scaling Rating as compared to an identical aqueous dye solution except that either Acid Red 361 or Acid Red 419 is used individually as the red component.

10. The composition of claim 9, wherein the blue component comprises one or more of a dye selected from the group consisting of: Acid Blue 25: Acid Blue 40; Acid Blue 41, Acid Blue 78: Acid Blue 129: Acid Blue 205: Acid Blue 260; Acid Blue 277: Acid Blue 288; Acid Blue 324; Acid Green 25, or a mixture thereof.

11. The composition of claim 9, wherein the red component consists of from about 80 parts to about 20 parts of Acid Red 361 and from about 20 parts to about 80 parts of Acid Red 419 to provide 100 total parts dye in the red component.

12. The composition of claim 9, wherein the red component consists of from about 55 parts to about 57 parts of Acid Red 361 and from about 45 parts to about 43 parts of Acid Red 419 to provide 100 total parts dye in the red component.

13. The composition of claim 9, wherein the aqueous solution further comprises one or more of a leveling agent, a wetting agent, a buffering agent, and a water treatment agent.

14. The composition of claim 9, wherein the yellow component comprises one or more of a dye selected from the group consisting of Acid Yellow 49; Acid Yellow 135; Acid Yellow 159; Acid Yellow 159:1; Acid Yellow 174; Acid Yellow 199; Acid Yellow 216; Acid Yellow 219, Acid Yellow 219:1; Acid Yellow 230; Acid Yellow 240; Acid Orange 47; Acid Orange 67; Acid Orange 116; Acid Orange 152, or a mixture thereof.

15. The composition of claim 9, wherein the yellow component consists of Acid Yellow 199 and Acid Yellow 219.

16. The composition of claim 15, wherein the blue component consists of Acid Blue 324.

* * * * *